US012678887B2

(12) United States Patent　　(10) Patent No.:　US 12,678,887 B2
Shima　　　　　　　　　　　　　(45) Date of Patent:　　　Jul. 14, 2026

(54) OPTICAL FIBER, LASER GENERATOR, LASER PROCESSING APPARATUS, AND METHOD OF MANUFACTURING OPTICAL FIBER

(71) Applicant: FUJIKURA LTD., Tokyo (JP)

(72) Inventor: Kensuke Shima, Chiba (JP)

(73) Assignee: Fujikura Ltd., Tokyo (JP)

( * ) Notice: Subject to any disclaimer, the term of this patent is extended or adjusted under 35 U.S.C. 154(b) by 1098 days.

(21) Appl. No.: 17/627,016

(22) PCT Filed: May 27, 2020

(86) PCT No.: PCT/JP2020/020866
§ 371 (c)(1),
(2) Date: Jan. 13, 2022

(87) PCT Pub. No.: WO2021/044677
PCT Pub. Date: Mar. 11, 2021

(65) Prior Publication Data
US 2022/0362878 A1　　Nov. 17, 2022

(30) Foreign Application Priority Data

Sep. 6, 2019　　(JP) ................................. 2019-163375

(51) Int. Cl.
B23K 26/03　　　(2006.01)
C03B 37/15　　　(2006.01)
G02B 6/036　　　(2006.01)
(52) U.S. Cl.
CPC .............. B23K 26/03 (2013.01); C03B 37/15 (2013.01); G02B 6/03666 (2013.01); G02B 6/03688 (2013.01)

(58) Field of Classification Search
CPC ...... B23K 26/03; B23K 26/064; C03B 37/15; G02B 6/03644; G02B 6/03666; G02B 6/03688; H01S 3/005
(Continued)

(56) References Cited

U.S. PATENT DOCUMENTS

| | | | |
|---|---|---|---|
| 10,423,015 B2 * | 9/2019 | Kliner .................. | B23K 26/342 |
| 2005/0013571 A1 | 1/2005 | Wood | |
| 2013/0223792 A1 | 8/2013 | Huber et al. | |

FOREIGN PATENT DOCUMENTS

| | | |
|---|---|---|
| JP | H11-084150 A | 3/1999 |
| JP | 3859836 B2 * | 12/2006 |

(Continued)

OTHER PUBLICATIONS

Machine translation of JP-3859836: Nishide, Manufacturing method and manufacturing apparatus of optical fiber grating, 2006 (Year: 2006).*

(Continued)

*Primary Examiner* — Vy T Nguyen
*Assistant Examiner* — Abigail H Rhue
(74) *Attorney, Agent, or Firm* — Osha Bergman Watanabe & Burton LLP

(57) ABSTRACT

An optical fiber includes: a center core; an inner ring layer, located outside of the center core in a radial direction, that has a refractive index lower than a refractive index of the center core; an outer core, located outside of the inner ring layer in the radial direction, that has a refractive index higher than the refractive index of the inner ring layer; and an outer ring layer, located outside of the outer core in the radial direction, that has a refractive index lower than the refractive index of the outer core. A relative refractive index difference $\Delta_{CF}$ between the center core and the inner ring layer varies along a longitudinal direction such that the relative refrac- (Continued)

tive index difference $\Delta_{CF}$ at a location along the longitudinal direction is smaller than a relative refractive index difference $\Delta_{PF}$ between the outer core and the outer ring layer.

14 Claims, 9 Drawing Sheets

(58) Field of Classification Search
USPC .......................................................... 219/121
See application file for complete search history.

(56) References Cited

FOREIGN PATENT DOCUMENTS

| | | | | | |
|---|---|---|---|---|---|
| JP | 2013-178497 | A | | 9/2013 | |
| JP | 6244308 | B2 | | 12/2017 | |
| JP | 2019-040131 | A | | 3/2019 | |
| WO | 2011/124671 | A1 | | 10/2011 | |
| WO | WO-2012102138 | A1 | * | 8/2012 | ......... B23K 26/0626 |
| WO | 2013/086227 | A1 | | 6/2013 | |
| WO | 2018/063452 | A1 | | 4/2018 | |

OTHER PUBLICATIONS

Machine translation of WO-2012102138: Miura, Optical Fiber and Laser Processing Apparatus Provided With Same, 2012 (Year: 2012).*
Notice of Reasons for Refusal issued in counterpart Japanese Patent Application No. JP 2019-163375 A mailed May 25, 2021 (9 pages).

* cited by examiner

1(2)

OPTICAL FIBER, LASER GENERATOR, LASER PROCESSING APPARATUS, AND METHOD OF MANUFACTURING OPTICAL FIBER

CROSS-REFERENCE TO RELATED APPLICATIONS

This is a national stage of International Patent Application No. PCT/JP2020/020866, filed on May 27, 2020, and claims priority from Japanese Patent Application No. 2019-163375, filed on Sep. 6, 2019. The content of these priority applications are incorporated herein by reference.

TECHNICAL FIELD

The present invention relates to an optical fiber, a laser generator, a laser processing apparatus, and a method of manufacturing an optical fiber, and more particularly to an optical fiber used to adjust an optical property of a laser beam.

BACKGROUND

Fiber laser devices have rapidly spread in various fields such as marking or material processing because they are more advantageous in that they have higher optical condensing capability and can use optical fibers, which can readily be routed, as compared to conventional laser devices. For example, when a metal material is processed with a fiber laser device, a high-power laser beam is directed to a workpiece to heat and melt the workpiece for welding, cutting, or the like. With such laser processing, it is important to change optical properties of a laser beam being applied depending on a material of a workpiece in order to improve processing performance such as a processing rate, a process quality, and the like.

For changing optical properties of a laser beam depending on a material of a workpiece, there has been known a technique of forming a plurality of optical waveguide layers in an optical fiber and adjusting a ratio of the powers of laser beams outputted from the respective optical waveguide layers. For example, there have been known a technique of inserting a wedge-shaped glass member into and removing it from between an optical fiber emitting a laser beam and an optical fiber having a plurality of optical waveguide layers to direct the laser beam selectively to a specific optical waveguide layer (see, e.g., Patent Literature 1), a technique of deflecting a laser beam emitted from an optical fiber with a lens so as to direct the laser beam to a specific optical waveguide layer of a downstream optical fiber (see, e.g., Patent Literature 2), and the like.

However, such conventional techniques use a glass member or a lens located between an upstream optical fiber and a downstream optical fiber and thus tend to have a complicated arrangement. Furthermore, the conventional techniques change an optical path of a laser beam with the glass member or the lens after the laser beam has been emitted from the upstream optical fiber. Therefore, a slight change of the position or orientation of the glass member or the lens greatly changes the location of the downstream optical fiber to which the laser beam is directed. Thus, it is difficult to direct a laser beam accurately to a desired optical waveguide layer of the downstream optical fiber. Furthermore, heat may be generated when the laser beam is applied to an end face of the downstream optical fiber or to foreign matter attached to the optical fiber, resulting in damages to the downstream optical fiber.

PATENT LITERATURE

Patent Literature 1: JP 6244308 B
Patent Literature 2: WO 2011/124671

SUMMARY

One or more embodiments of the present invention provide an optical fiber capable of readily outputting light having a desired optical property with a low loss.

Furthermore, one or more embodiments of the present invention provide a laser generator capable of readily outputting a laser beam having a desired optical property with a low loss.

Moreover, one or more embodiments of the present invention provide a laser processing apparatus capable of achieving high-quality processing according to a workpiece.

Furthermore, one or more embodiments of the present invention provide a method of readily manufacturing an optical fiber capable of outputting light having a desired optical property with a low loss.

According to one or more embodiments, there is provided an optical fiber capable of readily outputting light having a desired optical property with a low loss. This optical fiber has a center core, an inner ring layer located outside of the center core in a radial direction, at least one outer core located outside of the inner ring layer in the radial direction, and at least one outer ring layer located outside of the at least one outer core in the radial direction. The inner ring layer has a refractive index lower than a refractive index of the center core. The at least one outer core has a refractive index higher than the refractive index of the inner ring layer. The at least one outer ring layer having a refractive index lower than the refractive index of the at least one outer core. A relative refractive index difference $\Delta_{CF}$ between the center core and the inner ring layer varies along a longitudinal direction so that the relative refractive index difference $\Delta_{CF}$ in at least one location along the longitudinal direction is smaller than a relative refractive index difference $\Delta_{PF}$ between the at least one outer core and the outer ring layer located adjacently outside of the at least one outer core in the radial direction.

According to one or more embodiments, there is provided a laser generator capable of readily outputting a laser beam having a desired optical property with a low loss. This laser generator has at least one laser source operable to generate a laser beam, the aforementioned optical fiber, and a fiber bend unit operable to bend the optical fiber at the at least one location. The optical fiber is connected to a downstream side of the laser source so as to direct the laser beam from the at least one laser source to the center core.

According to one or more embodiments, there is provided a laser processing apparatus capable of achieving high-quality processing according to a workpiece. This laser processing apparatus has the aforementioned laser generator and a laser emission portion configured to emit the laser beam outputted from the laser generator to a workpiece.

According to one or more embodiments, there is provided a method of readily manufacturing an optical fiber capable of outputting light having a desired optical property with a low loss. With this method, a base optical fiber including a center core, an inner ring layer located outside of the center core in a radial direction, at least one outer core located outside of the inner ring layer in the radial direction, and at least one outer ring layer located outside of the at least one outer core in the radial direction is prepared. The inner ring layer includes a dopant having a property to lower a refractive index and has a refractive index lower than a refractive index of the center core. The at least one outer ring layer has a refractive index lower than the refractive index of the at least one outer core located adjacently inside of the at least one outer ring layer in the radial direction. The at least one outer core has a refractive index higher than the refractive index of the inner ring layer. With this method, at least one location of the base optical fiber along a longitudinal direction is heated to diffuse the dopant in the inner ring layer so that a relative refractive index difference $\Delta_{CF}$ between the center core and the inner ring layer becomes lower than a relative refractive index difference $\Delta_{PF}$ between the at least one outer core and the outer ring layer located adjacently outside of the at least one outer core in the radial direction. The dopant may be fluorine.

According to one or more embodiments, there is provided a method of readily manufacturing an optical fiber capable of outputting light having a desired optical property with a low loss. With this method, a base optical fiber including a center core including a dopant having a property to increase a refractive index, an inner ring layer located outside of the center core in a radial direction and having a refractive index lower than a refractive index of the center core, at least one outer core located outside of the inner ring layer in the radial direction, and at least one outer ring layer located outside of the at least one outer core in the radial direction is prepared. The at least one outer ring layer has a refractive index lower than a refractive index of the outer core located adjacently inside of the at least one outer ring layer in the radial direction. The at least one outer core has a refractive index higher than the refractive index of the inner ring layer. With this method, at least one location of the base optical fiber along a longitudinal direction is heated to diffuse the dopant in the center core so that a relative refractive index difference $\Delta_{CF}$ between the center core and the inner ring layer becomes lower than a relative refractive index difference $\Delta_{PF}$ between the at least one outer core and the outer ring layer located adjacently outside of the at least one outer core in the radial direction. The dopant may be germanium.

DETAILED DESCRIPTION

Figure 1:
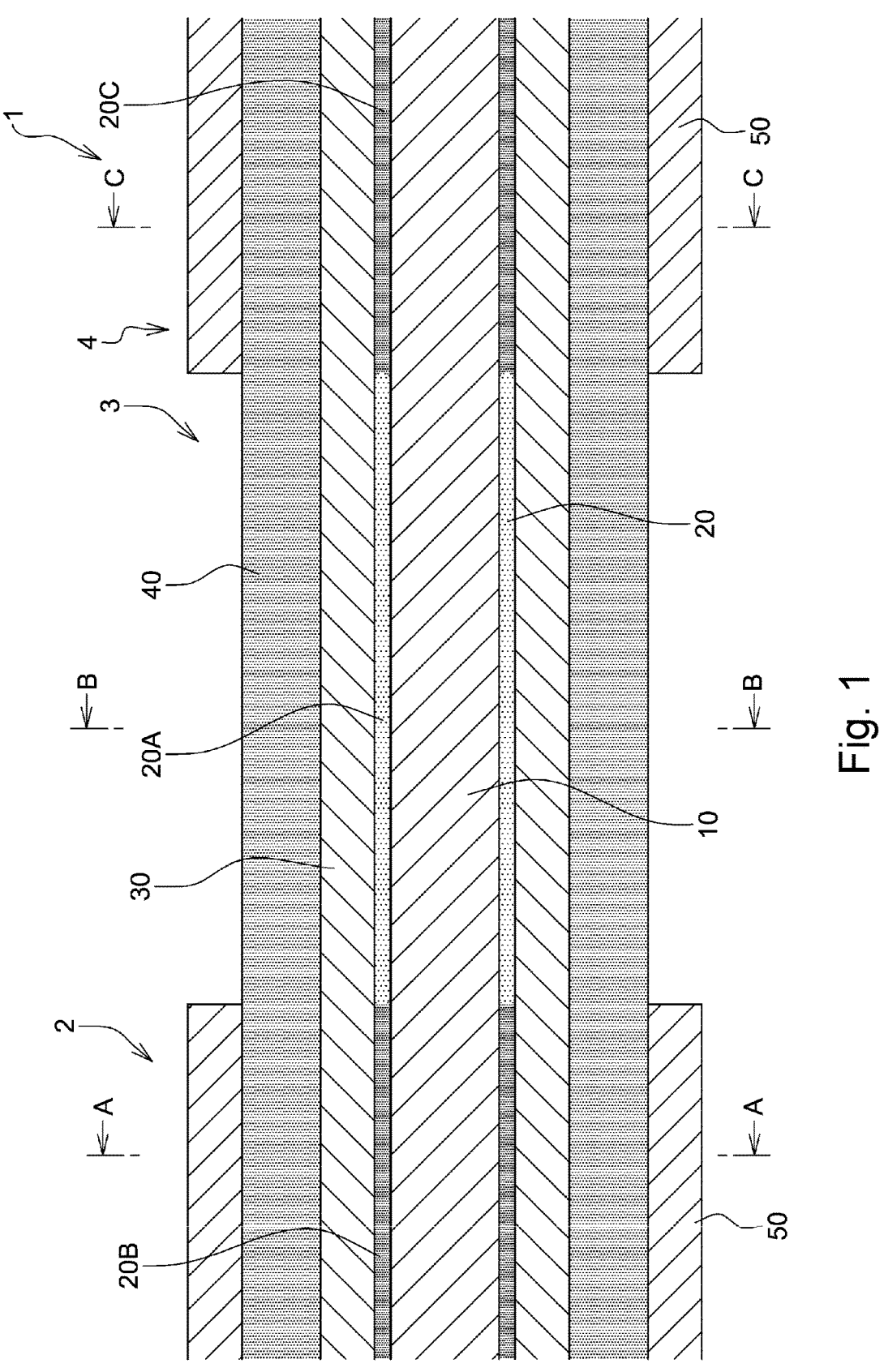
FIG. 1 is a cross-sectional view schematically showing an optical fiber according to one or more embodiments of the present invention.

Embodiments of an optical fiber according to the present invention will be described in detail below with reference to FIGS. 1 to 13. In FIGS. 1 to 13, the same or corresponding components are denoted by the same or corresponding reference numerals and will not be described below repetitively. Furthermore, in FIGS. 1 to 13, the scales or dimensions of components may be exaggerated, or some components may be omitted.

Figure 2:
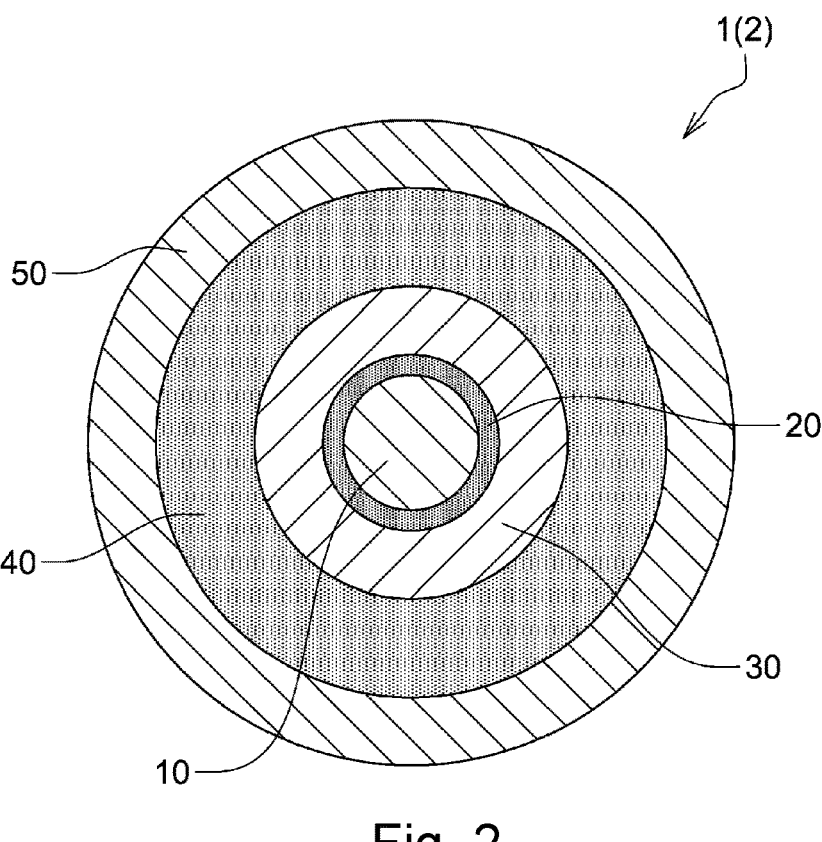
FIG. 2 is a cross-sectional view taken along line A-A of FIG. 1.

FIG. 1 is a cross-sectional view schematically showing an optical fiber 1 according to one or more embodiments of the present invention, and FIG. 2 is a cross-sectional view taken along line A-A of FIG. 1. As shown in FIG. 1, the optical fiber 1 includes an optical input portion 2 connected to a laser source such as a fiber laser, an optical process portion 3 having a structure capable of distributing light inputted from the optical input portion 2 into a plurality of optical waveguide layers, and an optical output portion 4 that allows light distributed by the optical process portion 3 to propagate therethrough.

As shown in FIGS. 1 and 2, the optical fiber 1 of one or more embodiments has a center core 10, an inner ring layer 20 that covers the center core 10, an outer core 30 that covers the inner ring layer 20, an outer ring layer 40 that covers the outer core 30, and a resin layer 50 that covers the outer ring layer 40. For example, the center core 10 and the outer core 30 are formed of $SiO_2$. A dopant having a property to lower the refractive index (e.g., fluorine (F) or boron (B)) has been doped to each of the inner ring layer 20 and the outer ring layer 40. For example, the center core 10 has an outside diameter of 100 μm, the inner ring layer 20 has an outside diameter of 110 μm, the outer core 30 has an outside diameter of 200 μm, and the outer ring layer 40 has an outside diameter of 360 μm.

Figure 3:
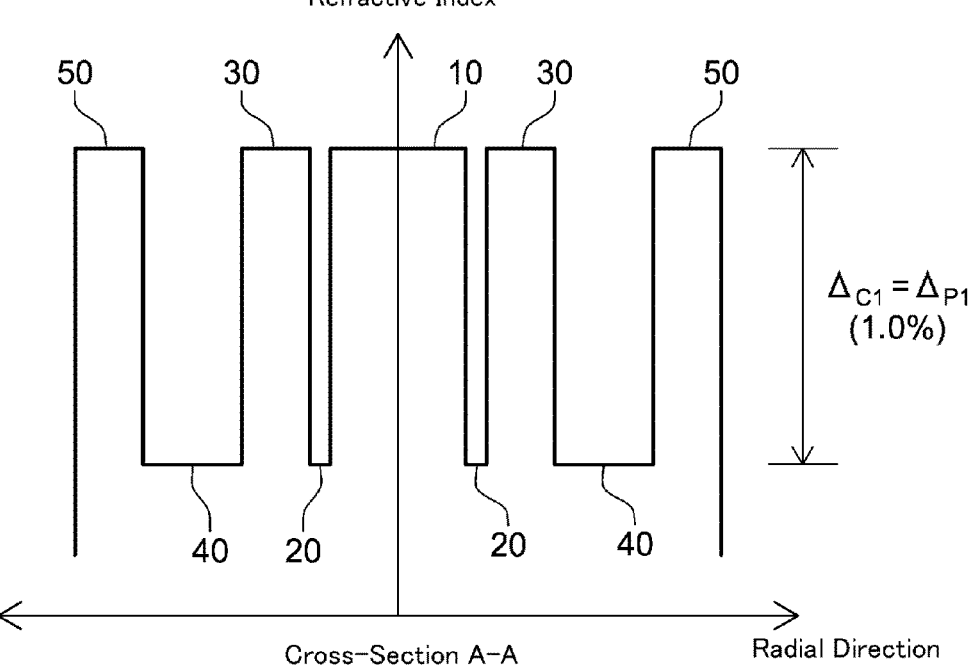
FIG. 3 is a graph showing a radial refractive index distribution of the optical fiber on a cross-section taken along line A-A of FIG. 1.

FIG. 3 is a graph showing a radial refractive index distribution of the optical input portion 2 on the cross-section taken along line A-A of FIG. 1. Since the dopant having a property to lower the refractive index has been doped to the inner ring layer 20 and the outer ring layer 40 as described above, each of the inner ring layer 20 and the outer ring layer 40 has a refractive index lower than the refractive indices of the center core 10 and the outer core 30 as illustrated in FIG. 3. Thus, the refractive index of the inner ring layer 20, which is located adjacently outside of the center core 10 in a radial direction, is lower than the refractive index of the center core 10. Accordingly, the center core 10 serves as an optical waveguide layer that confines light therein and allows the light to propagate therethrough. Furthermore, the refractive index of the inner ring layer 20, which is located adjacently inside of the outer core 30 in the radial direction, and the refractive index of the outer ring layer 40, which is located adjacently outside of the outer core 30 in the radial direction, are lower than the refractive index of the outer core 30. Accordingly, the outer core 30 serves as an optical waveguide layer that confines light therein and allows the light to propagate therethrough. In one or more embodiments, fluorine is used as a dopant described above. For example, the relative refractive index difference $\Delta_{C1}$ between the center core 10 and the inner ring layer 20 is 1.0%. The relative refractive index difference $\Delta_{P1}$ between the outer core 30 and the outer ring layer 40 is also 1.0%. In the example illustrated in FIG. 3, the relative refractive index difference $\Delta_{P1}$ between the outer core 30 and the outer ring layer 40 is the same as the relative refractive index difference $\Delta_{C1}$ between the center core 10 and the inner ring layer 20. Nevertheless, the relative refractive index difference $\Delta_{P1}$ between the outer core 30 and the outer ring layer 40 may be greater than the relative refractive index difference $\Delta_{C1}$ between the center core 10 and the inner ring layer 20.

Figure 4:
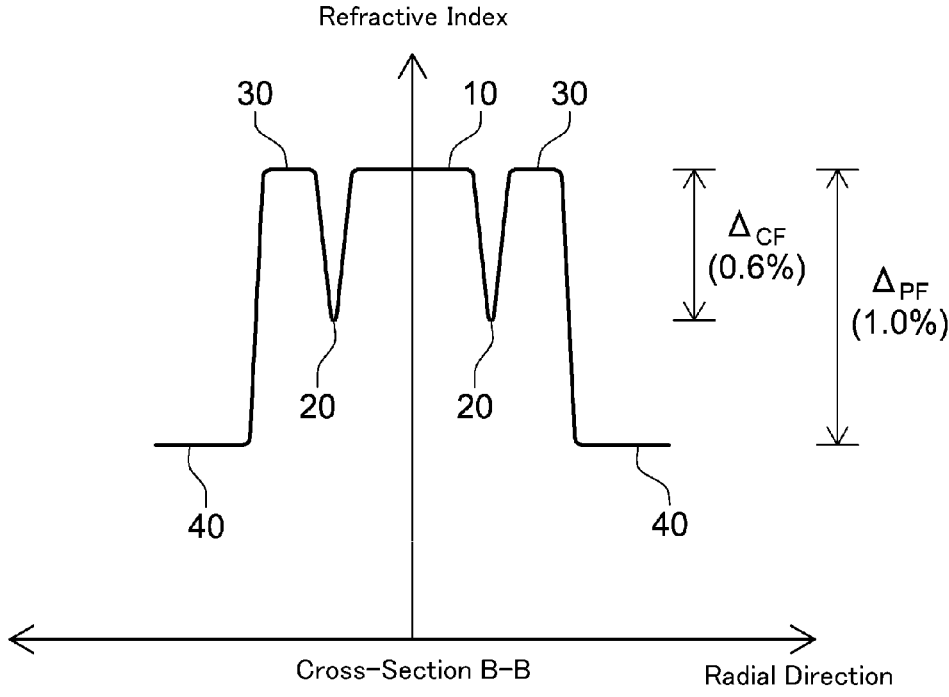
FIG. 4 is a graph showing a radial refractive index distribution of the optical fiber on a cross-section taken along line B-B of FIG. 1.

As shown in FIG. 1, the resin layer 50 has been removed in the optical process portion 3 so that the outer ring layer 40 is exposed to an outside. FIG. 4 is a graph showing a radial refractive index distribution of the optical process portion 3 on a cross-section taken along line B-B of FIG. 1. As shown in FIG. 4, the refractive index of the inner ring layer 20 is lower than the refractive index of the center core 10 in the optical process portion 3. However, the relative refractive index difference $\Delta_{CF}$ between the center core 10 and the inner ring layer 20 in the optical process portion 3 is smaller than the relative refractive index difference $\Delta_{C1}$ in the optical input portion 2. Furthermore, while the refractive index of the outer ring layer 40 is lower than the refractive index of the outer core 30, the relative refractive index difference $\Delta_{PF}$ between the outer core 30 and the outer ring layer 40 in the optical process portion 3 is equal to or smaller than the relative refractive index difference $\Delta_{P1}$ in the optical input portion 2. For example, the relative refractive index difference $\Delta_{CF}$ is 0.6%, and the relative refractive index difference $\Delta_{PF}$ is 1.0%.

Figure 5:
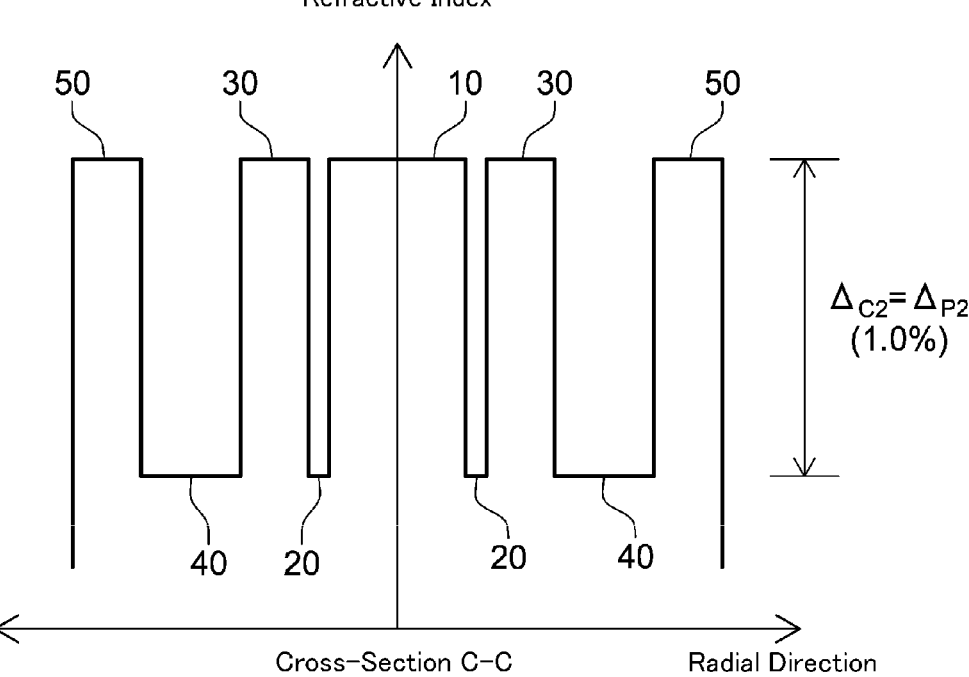
FIG. 5 is a graph showing a radial refractive index distribution of the optical fiber on a cross-section taken along line C-C of FIG. 1.

FIG. 5 is a graph showing a radial refractive index distribution of the optical output portion 4 on a cross-section taken along line C-C of FIG. 1. As shown in FIG. 5, the refractive index distribution in the optical output portion 4 is the same as the refractive index distribution in the optical input portion 2. For example, the relative refractive index difference $\Delta_{C2}$ between the center core 10 and the inner ring layer 20 is 1.0%, and the relative refractive index difference $\Delta_{P2}$ between the outer core 30 and the outer ring layer 40 is 1.0%. In the example illustrated in FIG. 5, the relative refractive index difference $\Delta_{P2}$ between the outer core 30 and the outer ring layer 40 is the same as the relative refractive index difference $\Delta_{C2}$ between the center core 10 and the inner ring layer 20. However, the relative refractive index difference $\Delta_{P2}$ between the outer core 30 and the outer ring layer 40 may be greater than the relative refractive index difference $\Delta_{C2}$ between the center core 10 and the inner ring layer 20.

In this manner, the refractive index of the inner ring layer 20 varies along a longitudinal direction. Specifically, the refractive index of the inner ring layer 20A in the optical process portion 3 is higher than the refractive index of the inner ring layer 20B in the optical input portion 2. The refractive index of the inner ring layer 20C in the optical output portion 4 is lower than the refractive index of the inner ring layer 20A in the optical process portion 3. As a result, the relative refractive index difference between the center core 10 and the inner ring layer 20 varies along the longitudinal direction. Specifically, the relative refractive index difference $\Delta_{CF}$ between the center core 10 and the inner ring layer 20A in the optical process portion 3 is smaller than the relative refractive index difference $\Delta_{C1}$ between the center core 10 and the inner ring layer 20B in the optical input portion 2. The relative refractive index difference $\Delta_{C2}$ between the center core 10 and the inner ring layer 20C in the optical output portion 4 is greater than the relative refractive index difference $\Delta_{CF}$ between the center core 10 and the inner ring layer 20A in the optical process portion 3. With such a configuration, the optical fiber 1 of one or more embodiments can direct light inputted to the center core 10 of the optical input portion 2 to the center core 10 and the outer core 30 of the optical output portion 4 at a desired ratio when it is used in the following manner.

Figure 6:
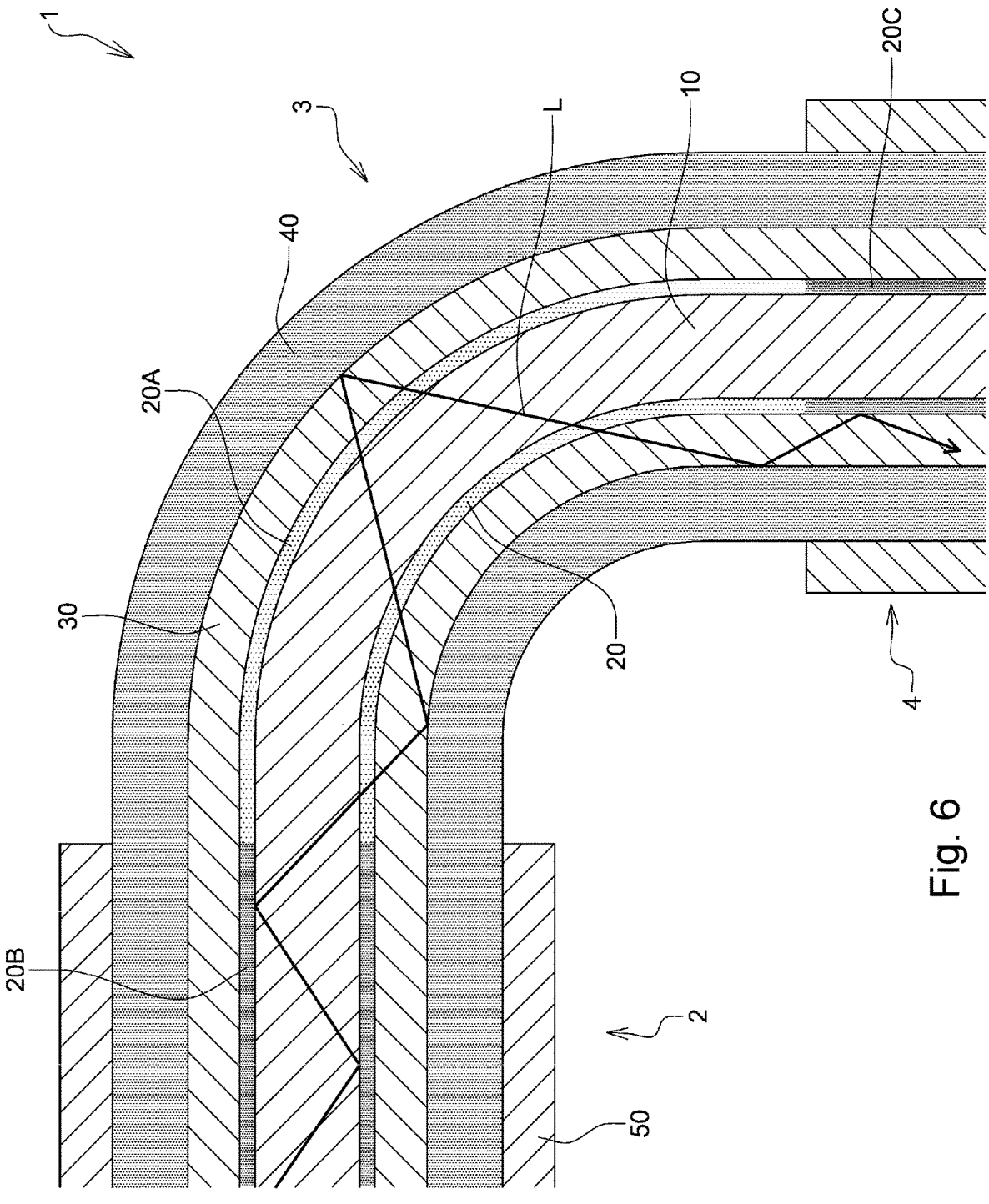
FIG. 6 is a cross-sectional view schematically showing an example of usage of the optical fiber illustrated in FIG. 1.

FIG. 6 is a cross-sectional view schematically showing an example of usage of the optical fiber 1. The aforementioned optical fiber 1 is used in a state in which it is bent at a portion of the optical process portion 3 as shown in FIG. 6. A laser source such as a fiber laser is connected to the optical input portion 2 of the optical fiber 1. A laser beam from the laser source is introduced into the center core 10 of the optical input portion 2. A resin may be applied to an outer circumferential surface of the outer ring layer 40 in the optical process portion 3 to protect the optical process portion 3.

As described above, the relative refractive index difference $\Delta_{CF}$ between the center core 10 and the inner ring layer 20A in the optical process portion 3 is smaller than the relative refractive index difference $\Delta_{C1}$ in the optical input portion 2. Therefore, the optical confinement effect of the center core 10 lessens in the optical process portion 3 as compared to that in the optical input portion 2. When the optical fiber 1 is bent at the optical process portion 3, a portion L of the laser beam that has propagated through the center core 10 of the optical input portion 2 can leak out of the center core 10 into the outer core 30 of the optical process portion 3. The portion L of the laser beam that has leaked to the outer core 30 can be introduced into the outer core 30 of the optical output portion 4. A portion of the laser beam that has propagated through the center core 10 of the optical input portion 2 leaks to the outer core 30 of the optical process portion 3 and then returns to the center core 10 or propagates through the center core 10 of the optical process portion 3 to the center core 10 of the optical output portion 4 without leakage.

In the optical output portion 4, the relative refractive index difference $\Delta_{C2}$ between the center core 10 and the inner ring layer 20C is greater than the relative refractive index difference $\Delta_{CF}$ in the optical process portion 3. Therefore, the laser beams divided to the center core 10 and the outer core 30 of the optical output portion 4 then propagate through the center core 10 and the outer core 30, respectively, without leakage. Accordingly, the quantity of the laser beam propagating through the center core 10 and the quantity of the laser beam propagating through the outer core 30 can be adjusted to a desired ratio in the optical output portion 4 by properly adjusting a radius of curvature of the optical fiber 1 in the optical process portion 3.

Figure 7A:
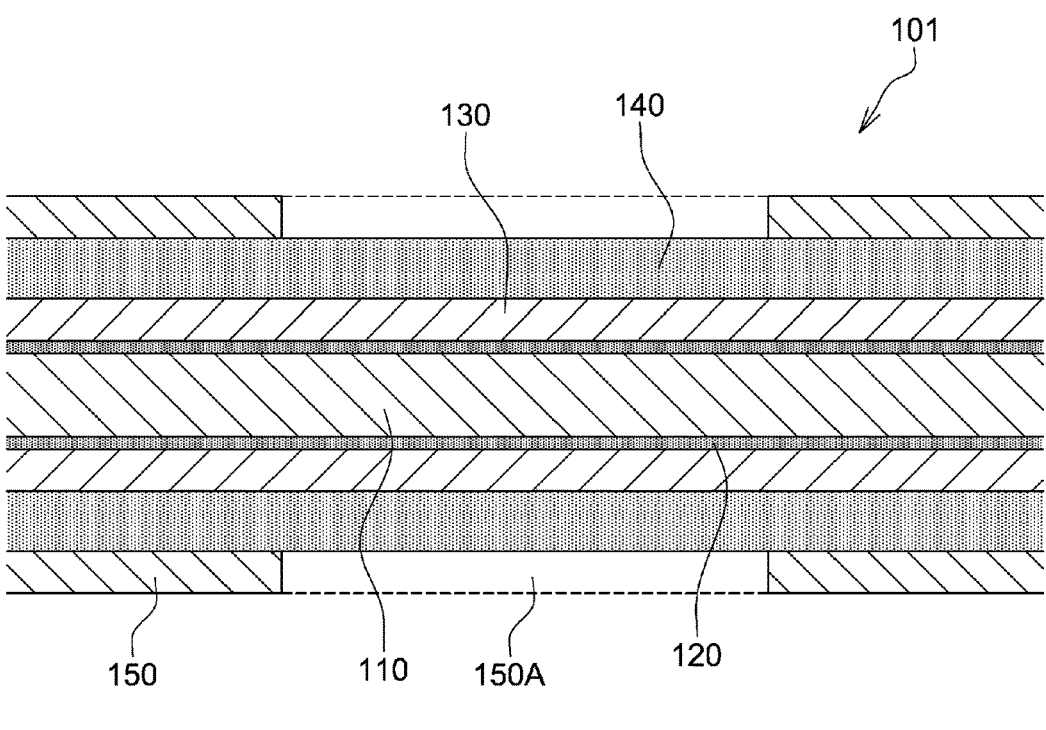
FIG. 7A is a cross-sectional view schematically showing a step of manufacturing the optical fiber shown in FIG. 1.

Now a method of manufacturing an optical fiber 1 having such a configuration will be described. When an optical fiber 1 is to be manufactured, a base optical fiber 101 having the same structure as the aforementioned optical input portion 2 or optical output portion 4 is prepared as shown in FIG. 7A. Specifically, the base optical fiber 101 has a center core 110, an inner ring layer 120 that covers the center core 110, an outer core 130 that covers the inner ring layer 120, an outer ring layer 140 that covers the outer core 130, and a resin layer 150 that covers the outer ring layer 140. For example, the center core 110 and the outer core 130 are formed of SiO$_2$. A dopant having a property to lower the refractive index (fluorine in this example) has been doped to each of the inner ring layer 120 and the outer ring layer 140. Therefore, the refractive index profile of the base optical fiber 101 is the same as that shown in FIG. 3 or 5. For example, the center core 110 has an outside diameter of 100 µm, the inner ring layer 120 has an outside diameter of 110 µm, the outer core 130 has an outside diameter of 200 µm, and the outer ring layer 140 has an outside diameter of 360 µm. The base optical fiber 101 may have a refractive index profile in which the relative refractive index difference Δ between the outer core 130 and the outer ring layer 140 is greater than the relative refractive index difference between the center core 110 and the inner ring layer 120.

Figure 7B:
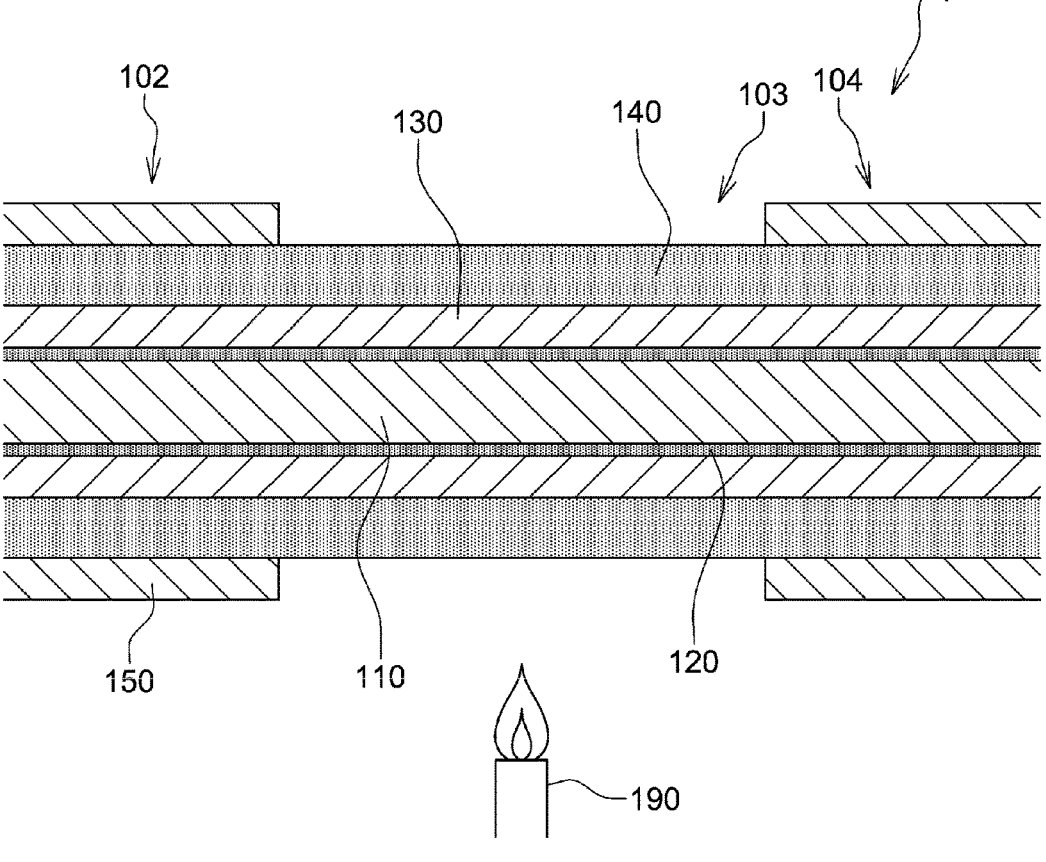
FIG. 7B is a cross-sectional view schematically showing a step of manufacturing the optical fiber shown in FIG. 1.

Then a portion 150A of the resin layer 150 is removed from the base optical fiber 101 so as to expose the outer ring layer 140. As shown in FIG. 7B, the exposed portion 103 of the outer ring layer 140 is heated to, for example, 1000° C. or higher from around the base optical fiber 101, for example, with use of a burner 190 or arc discharge. For example, the burner 190 is moved in a longitudinal direction by 50 mm to heat the exposed portion 103 of the outer ring layer 140. The heating causes diffusion of fluorine doped in the inner ring layer 120 and the outer ring layer 140. As a result, the refractive indices of the inner ring layer 120 and the outer ring layer 140 increase. The thickness of the outer ring layer 140 (80 µm) is much larger than the thickness of the inner ring layer 120 (5 µm). Additionally, fluorine in the outer ring layer 140 also diffuses into air. Therefore, the refractive index of the outer ring layer 140 does not greatly increase. Thus, the refractive index of the inner ring layer 120 increases more than that of the outer ring layer 140. As a result, the refractive index profile at the heated portion 103 changes into that shown in FIG. 4. The relative refractive index difference between the center core 110 and the inner ring layer 120 of the heated portion 103 becomes smaller than that of the unheated portions 102 and 104. Thus, an optical fiber 1 as shown in FIG. 1 is completed. The heated portion 103 of the base optical fiber 101 becomes the optical process portion 3 of the optical fiber 1. The unheated portions 102 and 104 become the optical input portion 2 and the optical output portion 4 of the optical fiber 1, respectively. A diffusion distance of a dopant such as fluorine varies according to a heating temperature or a heating duration. Therefore, the degree of an increase of the refractive index of the inner ring layer 120 can be controlled by properly adjusting the heating temperature or the heating duration in the aforementioned heating process. Thus, a desired refractive index profile can be obtained in the heated portion 103.

In the aforementioned example, the base optical fiber 101 is heated at one location along a longitudinal direction thereof. However, the base optical fiber 101 may be heated at a plurality of locations along the longitudinal direction thereof so as to form a plurality of portions where the inner ring layer 120 has an increased refractive index. Furthermore, in the above example, the portion 150A of the resin layer 150 is removed from the middle of the base optical fiber 101 before heating. For example, however, a portion of the resin layer 150 may be removed from an end of the base optical fiber 101. Then the end of the base optical fiber 101 may be abutted against another optical fiber. The portion where the optical fibers are abutted may be heated. In this case, fusion splicing of the base optical fiber 101 (optical fiber 1) and the other optical fiber can be achieved simultaneously with the aforementioned increase of the refractive index of the inner ring layer 120.

Furthermore, a dopant having a property to increase the refractive index (e.g., germanium (Ge) or phosphorus (P)) may be doped into the center core 110 of the base optical fiber 101, instead of doping a dopant having a property to lower the refractive index into the inner ring layer 120 of the base optical fiber 101. In this case, heating of the base optical fiber 101 causes diffusion of the dopant doped in the center core 110 to the inner ring layer 120. As a result, the refractive index of the inner ring layer 120 increases. Thus, an optical fiber having the same structure as the aforementioned optical fiber 1 can be obtained.

In the above examples, the optical fiber 1 is manufactured with use of diffusion of a dopant through heating. However, the refractive index of the inner ring layer 120 may be increased by releasing a stress between the center core 110 and the inner ring layer 120 of the base optical fiber 101 through heating. For example, when a material having a softening temperature lower than that of the inner ring layer 120 (for example, quartz glass to which germanium has been doped) is used for the center core 110, the inner ring layer 120 bears a spinning tension upon drawing (spinning) of the optical fiber. Therefore, a compressive stress remains in the center core 110 so that the refractive index of the center core 110 increases. When such a base optical fiber 101 is heated, the residual stress is released, so that the relative refractive index difference between the center core 110 and the inner ring layer 120 decreases. Accordingly, an optical fiber having the same structure as the aforementioned optical fiber 1 can be obtained.

Furthermore, there has been known that, when an ultraviolet ray having a wavelength around 250 nm is applied to quartz glass to which germanium has been doped, the refractive index of the quartz glass increases. Therefore, glass to which germanium has been doped may be used for the inner ring layer 120 of the base optical fiber 101, and an ultraviolet ray may be applied to the base optical fiber 101 to increase the refractive index of the inner ring layer 120. In this case, when germanium is doped into quartz, the doped quartz has an increased refractive index. Therefore, in order to lower the refractive index, fluorine or boron needs to be doped to the inner ring layer 120 in addition to germanium.

Figure 8:
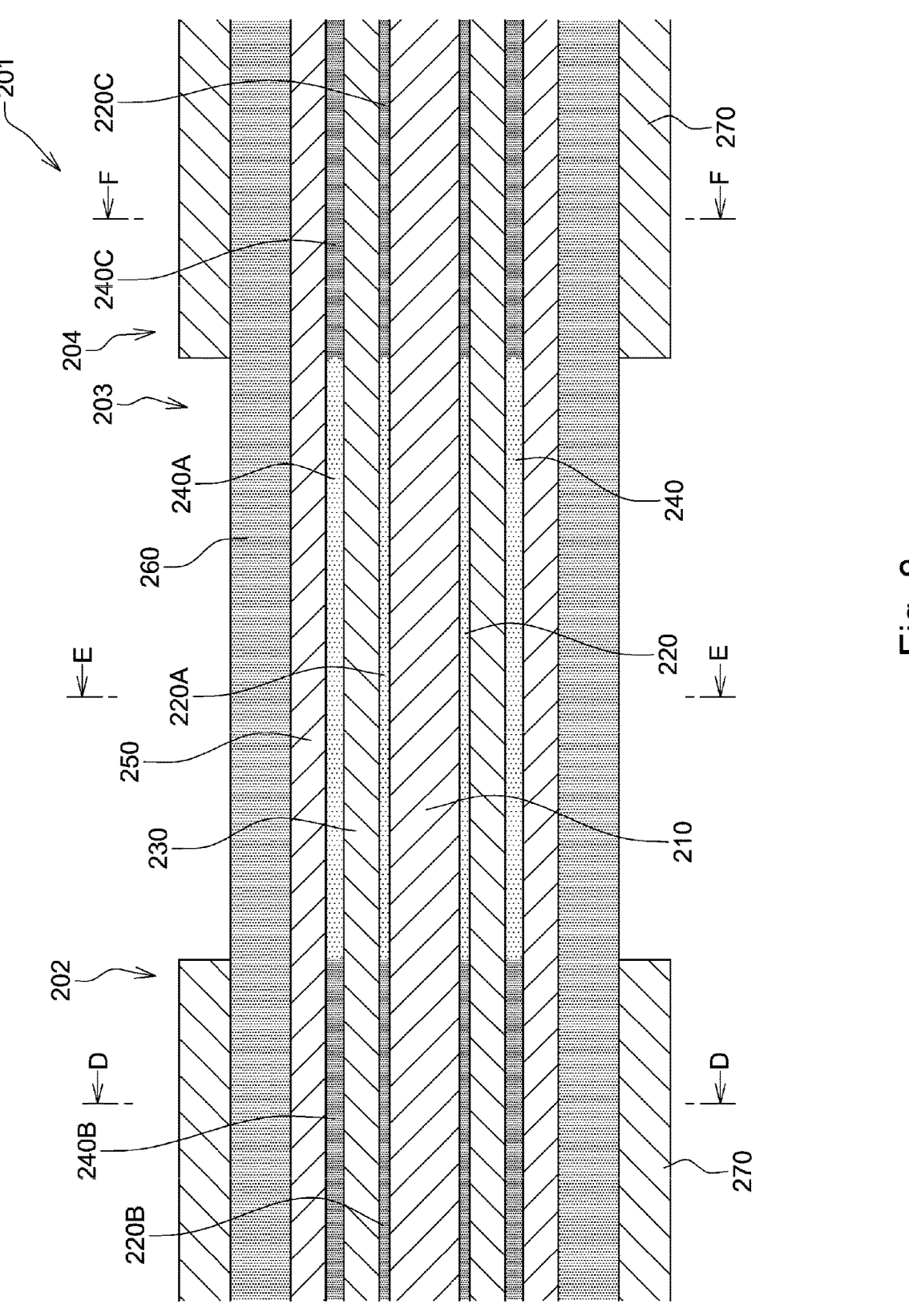
FIG. 8 is a cross-sectional view schematically showing an optical fiber according to one or more embodiments of the present invention.
Figure 9:
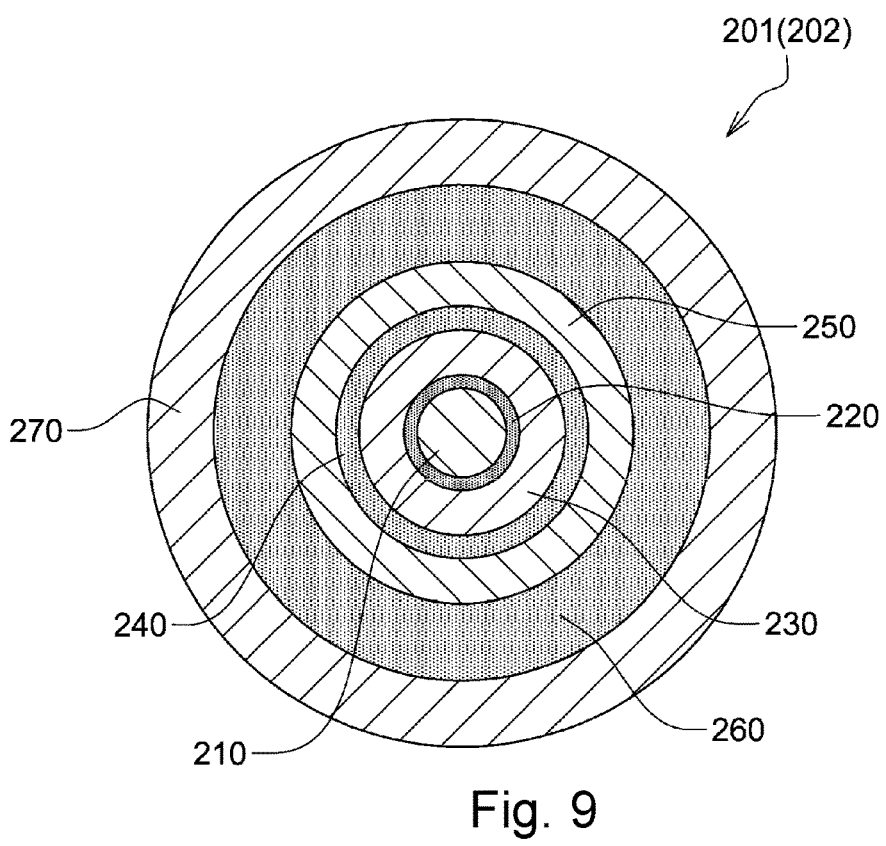
FIG. 9 is a cross-sectional view taken along line D-D of FIG. 8.

FIG. 8 is a cross-sectional view schematically showing an optical fiber 201 according to one or more embodiments of the present invention, and FIG. 9 is a cross-sectional view taken along line D-D of FIG. 8. As shown in FIG. 8, the optical fiber 201 includes an optical input portion 202 connected to a laser source such as a fiber laser, an optical process portion 203 having a structure capable of distributing light inputted from the optical input portion 202 into a desired one of a plurality of optical waveguide layers, and an optical output portion 204 that allows light distributed by the optical process portion 203 to propagate therethrough, as with the optical fiber 1 of the above-described embodiments. As shown in FIGS. 8 and 9, the optical fiber 201 of one or more embodiments has a center core 210, an inner ring layer 220 that covers the center core 210, a first outer core 230 that covers the inner ring layer 20, a first outer ring layer 240 that covers the first outer core 230, a second outer core 250 that covers the first outer ring layer 240, a second outer ring layer 260 that covers the second outer core 250, and a resin layer 270 that covers the second outer ring layer 260.

Figure 10:
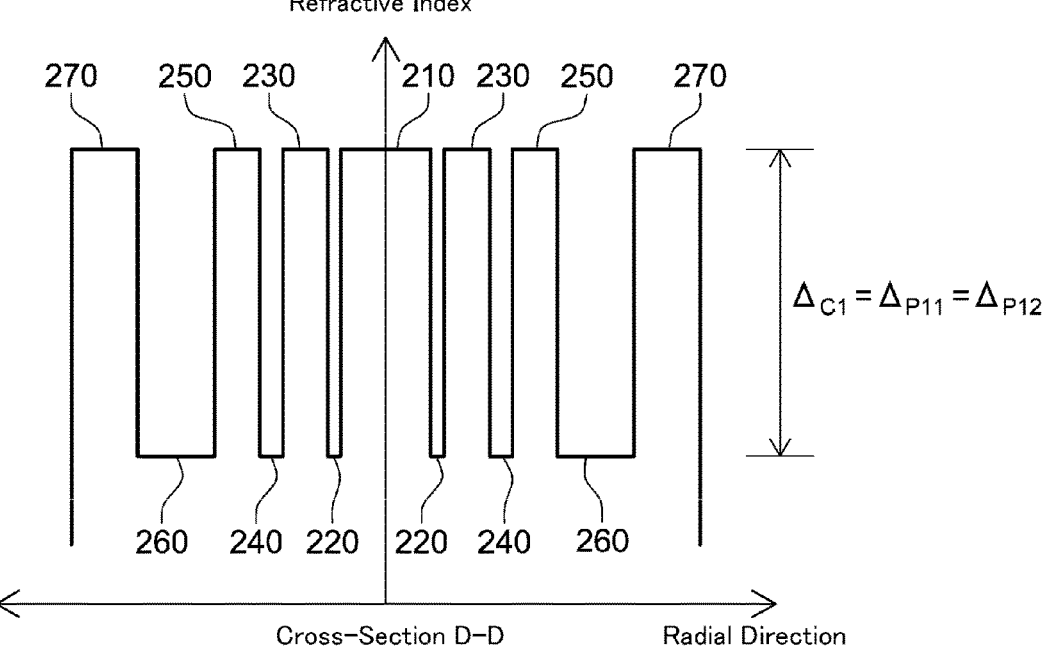
FIG. 10 is a graph showing a radial refractive index distribution of the optical fiber on a cross-section taken along line D-D of FIG. 8.

For example, the center core 210, the first outer core 230, and the second outer core 250 are formed of $SiO_2$. A dopant having a property to lower the refractive index (e.g., fluorine (F) or boron (B)) has been doped to each of the inner ring layer 220, the first outer ring layer 240, and the second outer ring layer 260. Thus, as shown in FIG. 10, the refractive indices of the inner ring layer 220, the first outer ring layer 240, and the second outer ring layer 260 are lower than the refractive indices of the center core 210, the first outer core 230, and the second outer core 250. In this manner, the refractive index of the inner ring layer 220, which is located adjacently outside of the center core 210 in a radial direction, is lower than the refractive index of the center core 210. Accordingly, the center core 210 serves as an optical waveguide layer that confines light therein and allows the light to propagate therethrough. Furthermore, the refractive index of the inner ring layer 220, which is located adjacently inside of the first outer core 230 in the radial direction, and the refractive index of the first outer ring layer 240, which is located adjacently outside of the first outer core 230 in the radial direction, are lower than the refractive index of the first outer core 230. Accordingly, the first outer core 230 serves as an optical waveguide layer that confines light therein and allows the light to propagate therethrough. Moreover, the refractive index of the first outer ring layer 240, which is located adjacently inside of the second outer core 250 in the radial direction, and the refractive index of the second outer ring layer 260, which is located adjacently outside of the second outer core 250 in the radial direction, are lower than the refractive index of the second outer core 250. Accordingly, the second outer core 250 serves as an optical waveguide layer that confines light therein and allows the light to propagate therethrough. In the example illustrated in FIG. 10, the relative refractive index difference $\Delta_{C1}$ between the center core 210 and the inner ring layer 220 is the same as the relative refractive index difference $\Delta_{P11}$ between the first outer core 230 and the first outer ring layer 240 and the relative refractive index difference $\Delta_{P12}$ between the second outer core 250 and the second outer ring layer 260.

Figure 11:
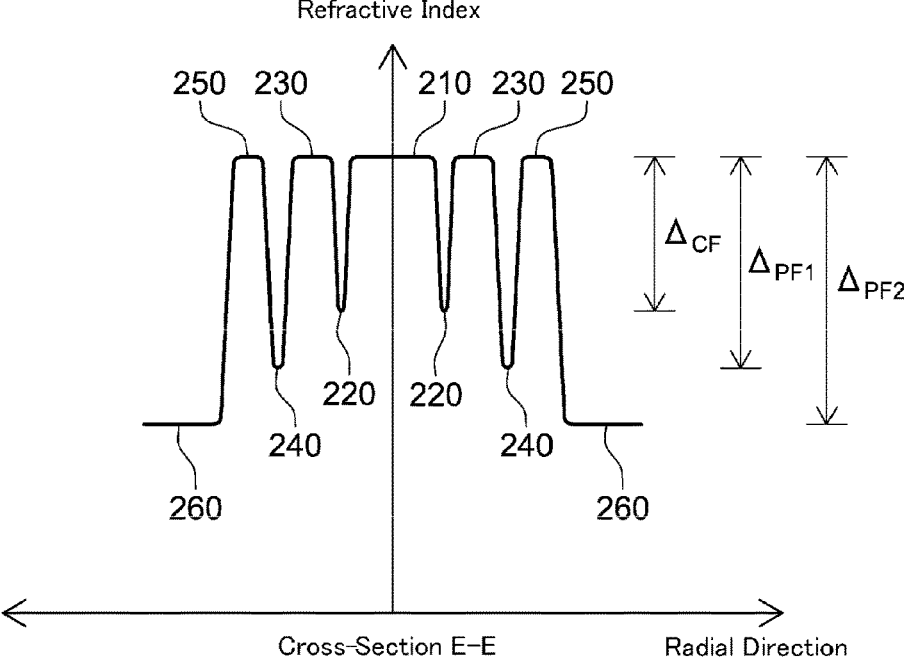
FIG. 11 is a graph showing a radial refractive index distribution of the optical fiber on a cross-section taken along line E-E of FIG. 8.

As shown in FIG. 8, the resin layer 270 has been removed in the optical process portion 203 so that the second outer ring layer 260 is exposed to an outside. FIG. 11 is a graph showing a radial refractive index distribution of the optical process portion 203 on a cross-section taken along line E-E of FIG. 8. As shown in FIG. 11, the refractive index of the inner ring layer 220 is lower than the refractive index of the center core 210 in the optical process portion 203. However, the relative refractive index difference $\Delta_{CF}$ between the center core 210 and the inner ring layer 220 in the optical process portion 203 is smaller than the relative refractive index difference $\Delta_{C1}$ in the optical input portion 202. Furthermore, the refractive index of the first outer ring layer 240 is lower than the refractive index of the first outer core 230. However, the relative refractive index difference $\Delta_{PF1}$ between the first outer core 230 and the first outer ring layer 240 in the optical process portion 203 is smaller than the relative refractive index difference $\Delta_{P11}$ in the optical input portion 202. Moreover, the refractive index of the second outer ring layer 260 is lower than the refractive index of the second outer core 250. However, the relative refractive index difference $\Delta_{PF2}$ between the second outer core 250 and the second outer ring layer 260 in the optical process portion 203 is equal to or smaller than the relative refractive index difference $\Delta_{P11}$ in the optical input portion 202. The relative refractive index difference $\Delta_{PF1}$ is greater than the relative refractive index difference $\Delta_{CF}$, and the relative refractive index difference $\Delta_{PF2}$ is greater than the relative refractive index difference $\Delta_{PF1}$. Thus, the relative refractive index difference between the core and the ring layer gradually increases along a radially outward direction.

Figure 12:
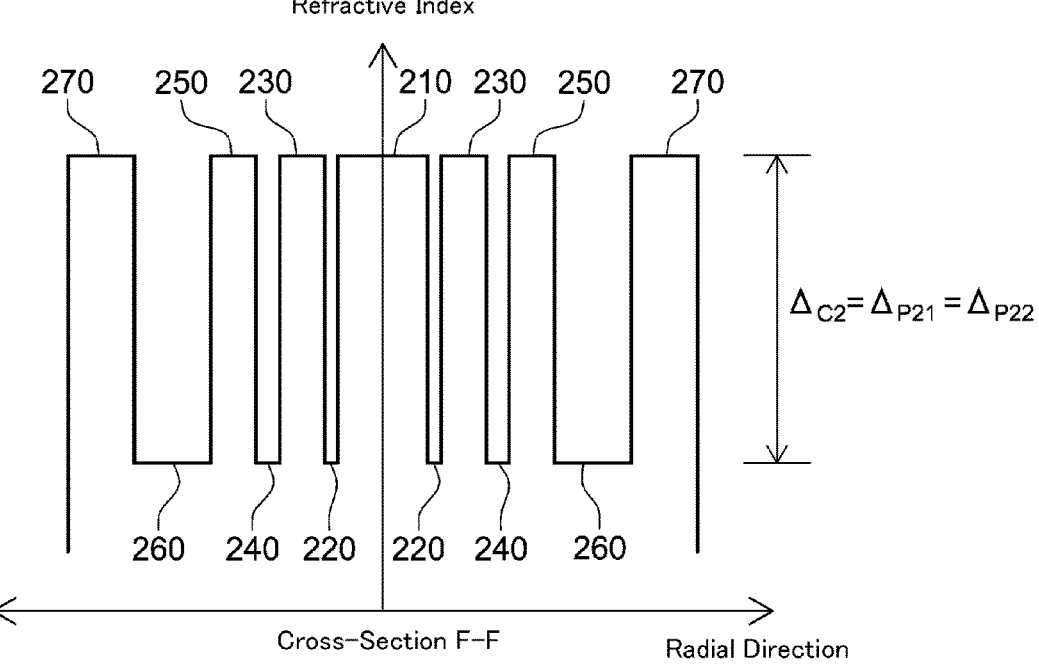
FIG. 12 is a graph showing a radial refractive index distribution of the optical fiber on a cross-section taken along line F-F of FIG. 8.

FIG. 12 is a graph showing a radial refractive index distribution of the optical output portion 204 on a cross-section taken along line F-F of FIG. 8. As shown in FIG. 12, the refractive index distribution in the optical output portion 204 is the same as the refractive index distribution in the optical input portion 202. In the example illustrated in FIG. 12, the relative refractive index difference $\Delta_{C2}$ between the center core 210 and the inner ring layer 220 is the same as the relative refractive index difference $\Delta_{P21}$ between the first outer core 230 and the first outer ring layer 240 and the relative refractive index difference $\Delta_{P22}$ between the second outer core 250 and the second outer ring layer 260.

In one or more embodiments, the relative refractive index difference between the center core 210 and the inner ring layer 220 varies along a longitudinal direction, and the relative refractive index difference between the first outer core 230 and the first outer ring layer 240 varies along the longitudinal direction. Specifically, the relative refractive index difference $\Delta_{CF}$ between the center core 210 and the inner ring layer 220A in the optical process portion 203 is smaller than the relative refractive index difference $\Delta_{C1}$ between the center core 210 and the inner ring layer 220B in the optical input portion 202 and the relative refractive index difference $\Delta_{C2}$ between the center core 210 and the inner ring layer 220C in the optical output portion 204. The relative refractive index difference $\Delta_{PF1}$ between the first outer core 230 and the first outer ring layer 240A in the optical process portion 203 is smaller than the relative refractive index difference $\Delta_{P11}$ between the first outer core 230 and the first outer ring layer 240B in the optical input portion 202 and the relative refractive index difference $\Delta_{P21}$ between the first outer core 230 and the first outer ring layer 240C in the optical output portion 204.

In this optical fiber 201, since the relative refractive index difference $\Delta_{CF}$ between the center core 210 and the inner ring layer 220A in the optical process portion 203 is smaller than the relative refractive index difference $\Delta_{C1}$ in the optical input portion 202, the optical confinement effect of the center core 210 lessens in the optical process portion 203 as compared to that in the optical input portion 202. Furthermore, since the relative refractive index difference $\Delta_{PF1}$ between the first outer core 230 and the first outer ring layer 240A in the optical process portion 203 is smaller than the relative refractive index difference $\Delta_{P11}$ in the optical input portion 202, the optical confinement effect of the first outer core 230 lessens in the optical process portion 203 as compared to that in the optical input portion 202.

Therefore, when the optical fiber 201 thus configured is bent at the optical process portion 203, a portion of the laser beam that has propagated through the center core 10 of the optical input portion 202 can leak out of the center core 210 into the first outer core 230 of the optical process portion 203. The portion of the laser beam that has leaked to the first outer core 230 can further leak into the second outer core 250. Thus, the quantity of the laser beam propagating through the center core 210, the quantity of the laser beam propagating through the first outer core 230, and the quantity of the laser beam propagating through the second outer core 250 can be adjusted to a desired ratio in the optical output portion 204 by properly adjusting a radius of curvature of the optical fiber 201 in the optical process portion 203.

With the optical process portion 203 of one or more embodiments, the relative refractive index difference $\Delta_{PF1}$ is

11 greater than the relative refractive index difference $\Delta_{CF}$. Therefore, when the radius of curvature of the optical fiber 201 in the optical process portion 203 is large, the laser beam only leaks to the first outer core 230. If the radius of curvature of the optical fiber 201 in the optical process portion 203 is made smaller, the laser beam can leak out of the first outer core 230 to the second outer core 250. Since the relative refractive index difference between the core and the ring layer gradually increases along a radially outward direction in this manner, cores to which light is to be introduced can be controlled from the center core to any of outer cores by properly adjusting the radius of curvature of the optical fiber 201 in the optical process portion 203.

The optical fiber 201 thus configured can be manufactured in the same manner as the optical fiber 1 of the above-described embodiments. Specifically, a portion of a resin layer 270 of a base optical fiber having a structure of the aforementioned optical input portion 202 or optical output portion 204 is removed so as to expose the second outer ring layer 260. The exposed portion of the second outer ring layer 260 is heated so as to diffuse fluorine doped in the inner ring layer 220, the first outer ring layer 240, and the second outer ring layer 260. The optical fiber 201 is thus manufactured. In order to ensure that the relative refractive index difference $\Delta_{CF}$ between the center core 210 and the inner ring layer 220 is smaller than the relative refractive index difference $\Delta_{PF1}$ between the first outer core 230 and the first outer ring layer 240 in the optical process portion 203, in one or more embodiments, the thickness of the inner ring layer 220 of the base optical fiber is adjusted to be smaller than the thickness of the first outer ring layer 240. Furthermore, in order to ensure that the relative refractive index difference $\Delta_{PF1}$ between the first outer core 230 and the first outer ring layer 240 is smaller than the relative refractive index difference $\Delta_{PF2}$ between the second outer core 250 and the second outer ring layer 260 in the optical process portion 203, in one or more embodiments, the thickness of the first outer ring layer 240 of the base optical fiber is adjusted to be smaller than the thickness of the second outer ring layer 260.

The optical fiber 201 of one or more embodiments includes two outer cores 230 and 250 and two outer ring layers 240 and 260. As a matter of course, however, one or more embodiments of the present invention are applicable to any optical fiber including three or more outer cores and three or more outer ring layers.

An optical fiber according to one or more embodiments of the present invention can be applied to a laser processing apparatus in the following manner. When an optical fiber according to one or more embodiments of the present invention is used for a laser processing apparatus, optical properties of a laser beam to be emitted to a workpiece can be changed readily and safely depending on a material of the workpiece.

Figure 13:
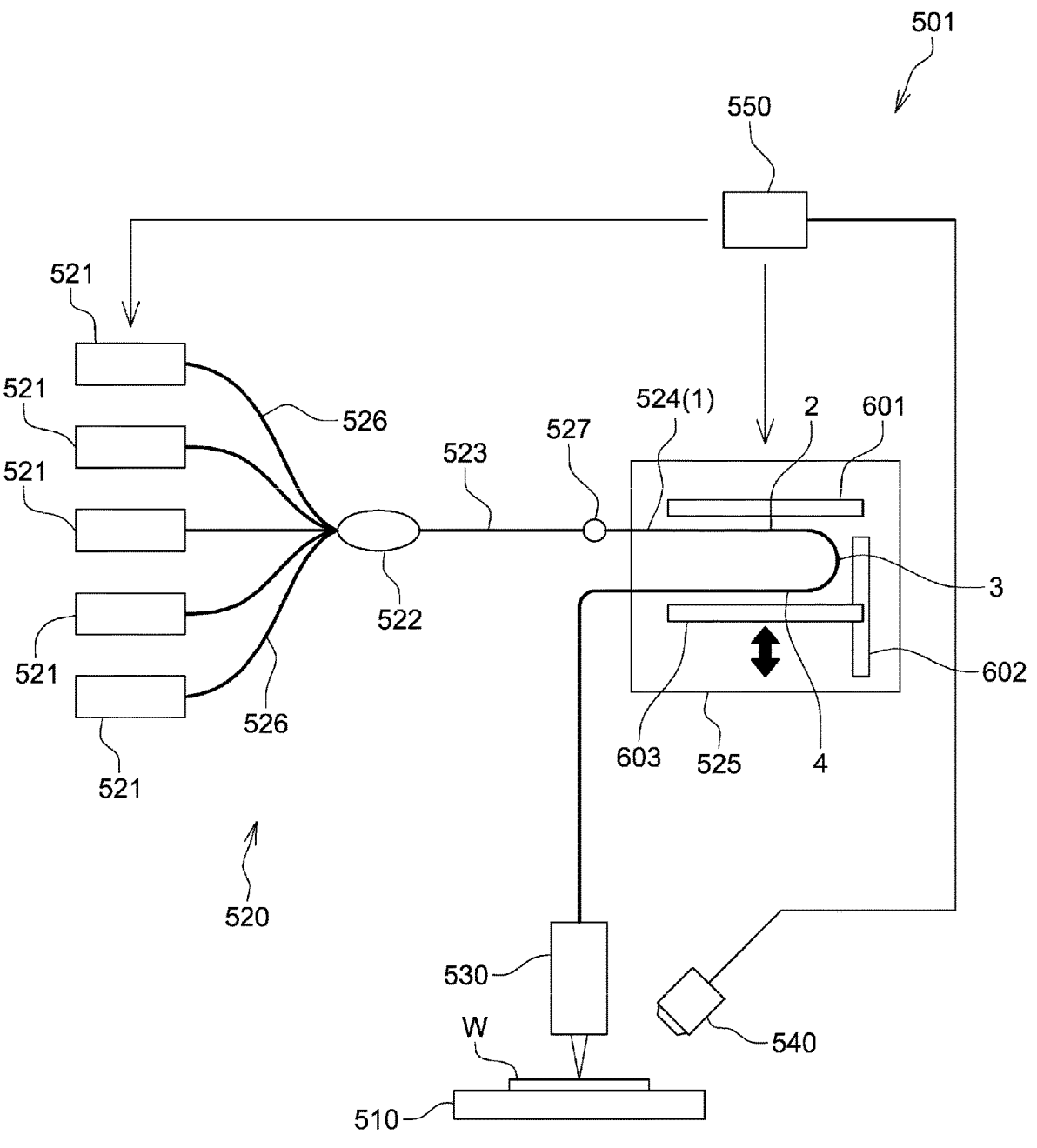
FIG. 13 is a schematic view showing an arrangement of a laser processing apparatus using an optical fiber according to one or more embodiments of the present invention.

FIG. 13 is a schematic view showing an arrangement of a laser processing apparatus 501 using an optical fiber according to one or more embodiments of the present invention. The laser processing apparatus 501 shown in FIG. 13 has a stage 510 configured to hold a workpiece W, a laser generator 520, a laser emission portion 530 (i.e., laser emitter) configured to direct a laser beam outputted from the laser generator 520 to the workpiece W on the stage 510, a process monitor 540 operable to detect a process condition of the workpiece W, and a controller 550 operable to control the laser generator 520 in response to a detection signal from the process monitor 540.

The laser generator 520 includes a plurality of laser sources 521, an optical combiner 522 operable to combine laser beams from those laser sources 521, a delivery fiber 523 extending from the optical combiner 522, an optical fiber 524 connected to the delivery fiber 523, and a fiber bend unit 525 configured to bend the optical fiber 524 with a predetermined radius of curvature. Each of the laser sources 521 generates an output laser beam having a predetermined wavelength (e.g., 1100 nm). For example, each of the laser sources 521 may be formed by a fiber laser including a master oscillator power amplifier (MOPA) or a fiber laser including an optical cavity.

Each of the laser sources 521 and the optical combiner 522 are connected to each other by an optical fiber 526. The delivery fiber 523 is connected to a downstream side of the optical combiner 522. The delivery fiber 523 and the optical fiber 524 are connected to each other at a fusion splice portion 527 by fusion splicing. The aforementioned optical fiber 1 or 201 can be used as the optical fiber 524. An example where the aforementioned optical fiber 1 is used as the optical fiber 524 will be described below.

The fiber bend unit 525 receives therein a portion of the optical fiber 524 (optical fiber 1) in a state in which it is bent. This fiber bend unit 525 is configured to adjust a radius of curvature of the optical fiber 1. For example, the fiber bend unit 525 may have a stationary portion 601 and a movable portion 603 that is movable on a rail 602. An optical process portion 3 of the optical fiber 1 being bent may be interposed between the stationary portion 601 and the movable portion 603. A radius of curvature of the optical process portion 3 can be adjusted by moving the movable portion 603 relative to the stationary portion 601 so as to change a distance between the stationary portion 601 and the movable portion 603. The mechanism for adjusting a radius of curvature of the optical fiber 1 is not limited to the illustrated example.

The controller 550 controls the laser sources 521 and the fiber bend unit 525 depending on the process condition of the workpiece W in response to the detection signal from the process monitor 540. For example, the controller 550 may control an electric current supplied to the laser sources 521 depending on the process condition of the workpiece W to adjust outputs of the laser beams emitted from the laser sources 521 or may move the movable portion 603 of the fiber bend unit 525 to adjust the optical properties of the laser beam outputted from the laser emission portion 530. The controller 550 may control the laser sources 521 and the fiber bend unit 525 in accordance with a preset program.

For example, in a case where a portion of a workpiece W to be processed is thin and is to be cut at a high speed, the controller 550 moves the movable portion 603 of the fiber bend unit 525 so as to increase a ratio of a laser beam outputted from a center core 10 of the optical fiber 1. In a case where a portion of a workpiece W to be processed is thick and is to be cut, the controller 550 moves the movable portion 603 of the fiber bend unit 525 in another direction so as to increase a ratio of a laser beam outputted from an outer core 30 of the optical fiber 1.

In the aforementioned example, the optical fiber 1 is bent at one location. Nevertheless, the optical fiber 1 may be bent at a plurality of locations. In a case where a high-power laser beam propagates through the center core 10, if the laser beam propagating through the center core 10 leaks to the outer core 30 at one location, then an optical loss may be caused by excessive leakage of the laser beam to the outer core 30. Such an optical loss can be reduced when the laser beam propagating through the center core 10 gradually leaks to the outer core 30 at a plurality of locations.

Although the above embodiments of the present invention have been described, the present invention is not limited to the aforementioned embodiments. It should be understood that various different forms may be applied to the present invention within the technical idea thereof.

As described above, according to one or more embodiments of the present invention, there is provided an optical fiber capable of readily outputting light having a desired optical property with a low loss. This optical fiber has a center core, an inner ring layer located outside of the center core in a radial direction, at least one outer core located outside of the inner ring layer in the radial direction, and at least one outer ring layer located outside of the at least one outer core in the radial direction. The inner ring layer has a refractive index lower than a refractive index of the center core. The at least one outer core has a refractive index higher than the refractive index of the inner ring layer. The at least one outer ring layer having a refractive index lower than the refractive index of the at least one outer core. A relative refractive index difference $\Delta_{CF}$ between the center core and the inner ring layer varies along a longitudinal direction so that the relative refractive index difference $\Delta_{CF}$ in at least one location along the longitudinal direction is smaller than a relative refractive index difference $\Delta_{PF}$ between the at least one outer core and the outer ring layer located adjacently outside of the at least one outer core in the radial direction.

According to this configuration, the optical confinement effect of the center core lessens in the at least one location along the longitudinal direction. When the optical fiber is bent at that location, a portion of light that has propagated through the center core can leak out of the center core into the outer core. Therefore, the quantity of light propagating through the center core and the quantity of light propagating through the outer core can be adjusted to a desired ratio by properly adjusting a radius of curvature of the optical fiber. Thus, light having a desired optical property can readily be outputted with a low loss.

In one or more embodiments, for more effectively reducing the relative refractive index difference $\Delta_{CF}$ below the relative refractive index difference $\Delta_{PF}$, the thickness of the inner ring layer may be smaller than the thickness of the at least one outer ring layer.

The at least one outer core may include a plurality of outer cores, and the at least one outer ring layer may include the same number of outer ring layers as the at least one outer core. In this case, light propagating through the center core can be divided into the center core and the plurality of outer cores. Therefore, the optical property of the outputted light can be controlled more finely.

In this case, a relative refractive index difference $\Delta_{PF}$, between the outer core of the plurality of outer cores and the outer ring layer located adjacently outside of the outer core in the radial direction may increase gradually along a radially outward direction in the at least one location in one or more embodiments. As the radius of curvature of the optical fiber becomes smaller, light propagating through the center core is likely to leak to more radially outer side. This configuration makes it easier to control the optical property of the outputted light by adjusting the radius of curvature of the optical fiber.

As described above, the optical fiber may be bent in the at least one location. Furthermore, the least one location may include a plurality of locations along the longitudinal direction.

In one or more embodiments, the relative refractive index difference $\Delta_{CF}$ may be smaller than a relative refractive index difference $\Delta_{C1}$ between the center core and the inner ring layer in a location upstream of the at least one location along the longitudinal direction. In this case, light is unlikely to leak out of the center core on an upstream side of the at least one location.

In one or more embodiments, the relative refractive index difference $\Delta_{CF}$ may be smaller than a relative refractive index difference $\Delta_{C2}$ between the center core and the inner ring layer in a location downstream of the at least one location along the longitudinal direction. In this case, light divided into the center core and the outer core is unlikely to leak to the other core on a downstream side of the at least one location.

According to one or more embodiments of the present invention, there is provided a laser generator capable of readily outputting a laser beam having a desired optical property with a low loss. This laser generator has at least one laser source operable to generate a laser beam, the aforementioned optical fiber, and a fiber bend unit operable to bend the optical fiber at the at least one location. The optical fiber is connected to a downstream side of the laser source so as to direct the laser beam from the at least one laser source to the center core.

With this configuration, when the optical fiber is bent in the fiber bend unit, a portion of the laser beam that has propagated through the center core of the optical fiber can leak out of the center core into the outer core. Therefore, the quantity of the laser beam propagating through the center core and the quantity of the laser beam propagating through the outer core can be adjusted to a desired ratio by properly adjusting a radius of curvature of the optical fiber in the fiber bend unit. Thus, a laser beam having a desired optical property can readily be outputted with a low loss.

In one or more embodiments, the fiber bend unit may be configured to adjust a radius of curvature of the optical fiber so that an optical property of the outputted laser beam can be adjusted as desired.

According to one or more embodiments of the present invention, there is provided a laser processing apparatus capable of achieving high-quality processing according to a workpiece. This laser processing apparatus has the aforementioned laser generator and a laser emission portion configured to emit the laser beam outputted from the laser generator to a workpiece.

With this configuration, a laser beam having such a desired optical property to be suitable for a workpiece can be directed to the workpiece. Therefore, the quality of laser processing is improved.

In one or more embodiments, the aforementioned laser processing apparatus may have a process monitor operable to detect a process condition of the workpiece and a controller operable to adjust a curvature of the optical fiber in the fiber bend unit of the laser generator according to an output from the process monitor. With this configuration, an optical property of the laser beam to be directed to a workpiece can be adjusted depending on the process condition of the workpiece. Therefore, the quality of laser processing is further improved.

According to one or more embodiments of the present invention, there is provided a method of readily manufacturing an optical fiber capable of outputting light having a desired optical property with a low loss. With this method, a base optical fiber including a center core, an inner ring layer located outside of the center core in a radial direction, at least one outer core located outside of the inner ring layer in the radial direction, and at least one outer ring layer located outside of the at least one outer core in the radial direction is prepared. The inner ring layer includes a dopant having a property to lower a refractive index and has a refractive index lower than a refractive index of the center core. The at least one outer ring layer has a refractive index lower than a refractive index of the at least one outer core located adjacently inside of the at least one outer ring layer in the radial direction. The at least one outer core has a refractive index higher than the refractive index of the inner ring layer. With this method, at least one location of the base optical fiber along a longitudinal direction is heated to diffuse the dopant in the inner ring layer so that a relative refractive index difference $\Delta_{CF}$ between the center core and the inner ring layer becomes lower than a relative refractive index difference $\Delta_{PF}$ between the at least one outer core and the outer ring layer located adjacently outside of the at least one outer core in the radial direction. The dopant may be fluorine.

According to one or more embodiments of the present invention, there is provided a method of readily manufacturing an optical fiber capable of outputting light having a desired optical property with a low loss. With this method, a base optical fiber including a center core including a dopant having a property to increase a refractive index, an inner ring layer located outside of the center core in a radial direction and having a refractive index lower than a refractive index of the center core, at least one outer core located outside of the inner ring layer in the radial direction, and at least one outer ring layer located outside of the at least one outer core in the radial direction is prepared. The at least one outer ring layer has a refractive index lower than a refractive index of the outer core located adjacently inside of the at least one outer ring layer in the radial direction. The at least one outer core has a refractive index higher than the refractive index of the inner ring layer. With this method, at least one location of the base optical fiber along a longitudinal direction is heated to diffuse the dopant in the center core so that a relative refractive index difference $\Delta_{CF}$ between the center core and the inner ring layer becomes lower than a relative refractive index difference $\Delta_{PF}$ between the at least one outer core and the outer ring layer located adjacently outside of the at least one outer core in the radial direction. The dopant may be germanium.

With those methods, the aforementioned optical fiber, which is capable of outputting light having a desired optical property with a low loss, can be manufactured with ease.

The at least one location may be an end of the base optical fiber that is abutted against another optical fiber. In this case, fusion splicing of the base optical fiber and the other optical fiber can be achieved simultaneously with the increase of the refractive index of the inner ring layer.

In the base fiber prior to heating the at least one location, a relative refractive index difference between the at least one outer core and the outer ring layer located adjacently outside of the at least one outer core in the radial direction may be equal to or greater than a relative refractive index difference between the center core and the inner ring layer.

According to one or more embodiments of the present invention, the optical confinement effect of the center core lessens in the at least one location along the longitudinal direction. When the optical fiber is bent at that location, a portion of light that has propagated through the center core can leak out of the center core into the outer core. Therefore, the quantity of light propagating through the center core and the quantity of light propagating through the outer core can be adjusted to a desired ratio by properly adjusting a radius of curvature of the optical fiber. Thus, light having a desired optical property can readily be outputted with a low loss.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

INDUSTRIAL APPLICABILITY

One or more embodiments of the present invention are suitably used for an optical fiber used to adjust an optical property of a laser beam.

DESCRIPTION OF REFERENCE NUMERALS AND SIGNS

1 Optical fiber
2 Optical input portion
3 Optical process portion
4 Optical output portion
10 Center core
20 Inner ring layer
30 Outer core
40 Outer ring layer
50 Resin layer
101 Base optical fiber
103 Heated portion
110 Center core
120 Inner ring layer
130 Outer core
140 Outer ring layer
150 Resin layer
190 Burner
201 Optical fiber
202 Optical input portion
203 Optical process portion
204 Optical output portion
210 Center core
220 Inner ring layer
230 First outer core
240 First outer ring layer
250 Second outer core
260 Second outer ring layer
270 Resin layer
501 Laser processing apparatus
510 Stage
520 Laser generator
521 Laser source
522 Optical combiner
523 Delivery fiber
524 Optical fiber
525 Fiber bend unit
530 Laser emission portion
540 Process monitor
550 Controller
601 Stationary portion
602 Rail
603 Movable portion
W Workpiece

The invention claimed is:
1. An optical fiber comprising:
a center core;
an inner ring layer located outside of the center core in a radial direction of the optical fiber, the inner ring layer having a refractive index lower than a refractive index of the center core;

one or more outer cores, each located outside of the inner ring layer in the radial direction and having a refractive index higher than the refractive index of the inner ring layer; and one or more outer ring layers, each located outside of the outer core in the radial direction and having a refractive index lower than the refractive index of the outer core, wherein the optical fiber is a single optical fiber extending continuously between opposite ends along a longitudinal direction, a relative refractive index difference $\Delta_{CF}$ between the center core and the inner ring layer varies along the longitudinal direction of the optical fiber such that the relative refractive index difference $\Delta_{CF}$ at one or more locations between the opposite ends along the longitudinal direction is smaller than a relative refractive index difference $\Delta_{PF}$ between the one or more outer cores and the one or more outer ring layers located adjacently outside of the one or more outer cores in the radial direction, the relative refractive index difference $\Delta_{CF}$ in the one or more locations is locally smaller than:

a refractive index difference $\Delta_{C1}$ between the center core and the inner ring layer in an upstream location located upstream of the one or more locations along the longitudinal direction; and a relative refractive index difference $\Delta_{C2}$ between the center core and the inner ring layer in a downstream location located downstream of the one or more locations along the longitudinal direction, so as to allow a portion of light propagating through the center core in the upstream location to be introduced to the outer core in the downstream location, a difference between the relative refractive index difference $\Delta_{CF}$ in the one or more locations and the refractive index difference $\Delta_{C1}$ is greater than a difference between the relative refractive index difference $\Delta_{PF}$ in the one or more locations and a refractive index difference $\Delta_{P1}$ between the one or more outer cores and the one or more outer ring layers in the upstream location, and a difference between the relative refractive index difference $\Delta_{CF}$ in the one or more locations and the refractive index difference $\Delta_{C2}$ is greater than a difference between the relative refractive index difference $\Delta_{PF}$ in the one or more locations and a refractive index difference $\Delta_{P2}$ between the one or more outer cores and the one or more outer ring layers in the downstream location.

2. The optical fiber as recited in claim 1, wherein a thickness of the inner ring layer is smaller than a thickness of the one or more outer ring layers.

3. The optical fiber as recited in claim 1, the optical fiber comprises two or more outer cores and the same number of the outer ring layers.

4. The optical fiber as recited in claim 3, wherein, at the one or more locations, a relative refractive index difference $\Delta_{PFn}$ between each of the outer cores and a corresponding one of the outer ring layers located adjacently outside of the outer cores in the radial direction increases along the radial direction.

5. The optical fiber as recited in claim 1, wherein the optical fiber is bent at the location.

6. A laser generator comprising:
a laser source that generates a laser beam;

the optical fiber as recited in claim 1, the optical fiber being connected to a downstream side of the laser source to direct the laser beam from the laser source to the center core; and a fiber bend unit that bends the optical fiber at the location.

7. A laser processing apparatus comprising:
the laser generator as recited in claim 6;
a laser emitter that emits the laser beam from the laser generator to a workpiece;
a process monitor that detects a process condition of the workpiece; and
a controller that adjusts a curvature of the optical fiber in the fiber bend unit of the laser generator according to an output from the process monitor.

8. The optical fiber as recited in claim 1, wherein a refractive index distribution in the upstream location is the same as a refractive index distribution in the downstream location.

9. A method of manufacturing an optical fiber, the method comprising:
preparing a single base optical fiber extending continuously between opposite ends along a longitudinal direction, the single base optical fiber including:
a center core,
an inner ring layer located outside of the center core in a radial direction of the optical fiber, wherein the inner ring layer has a refractive index lower than a refractive index of the center core and includes a dopant that lowers a refractive index,
one or more outer cores, each located outside of the inner ring layer in the radial direction and having a refractive index higher than the refractive index of the inner ring layer, and
one or more outer ring layers, each located outside of the outer core in the radial direction and having a refractive index lower than the refractive index of the one or more outer cores located adjacently inside of the one or more outer ring layers in the radial direction; and
heating one or more locations of the single base optical fiber between the opposite ends along the longitudinal direction of the single base optical fiber to diffuse the dopant in the inner ring layer such that a relative refractive index difference $\Delta_{CF}$ between the center core and the inner ring layer becomes lower than a relative refractive index difference $\Delta_{PF}$ between the one or more outer cores and the one or more outer ring layers located adjacently outside of the one or more outer cores in the radial direction, and that the relative refractive index difference $\Delta_{CF}$ in the one or more locations is locally smaller than a refractive index difference $\Delta_{C1}$ between the center core and the inner ring layer in an upstream location located upstream of the one or more locations along the longitudinal direction and a relative refractive index difference $\Delta_{C2}$ between the center core and the inner ring layer in a downstream location located downstream of the one or more locations along the longitudinal direction, wherein a difference between the relative refractive index difference $\Delta_{CF}$ in the one or more locations and the refractive index difference $\Delta_{C1}$ is greater than a difference between the relative refractive index difference $\Delta_{PF}$ in the one or more locations and a refractive index difference $\Delta_{P1}$ between the one or more outer cores and the one or more outer ring layers in the upstream location, and a difference between the relative refractive index differ-ence $\Delta_{CF}$ in the one or more locations and the refractive index difference $\Delta_{C2}$ is greater than a difference between the relative refractive index difference $\Delta_{PF}$ in the one or more locations and a refractive index dif-ference $\Delta_{P2}$ between the one or more outer cores and the one or more outer ring layers in the downstream location.

10. The method of manufacturing the optical fiber as recited in claim 9, wherein the dopant is fluorine.

11. The method of manufacturing the optical fiber as recited in claim 9, wherein, in the single base optical fiber prior to heating the one or more locations, a relative refractive index difference between the one or more outer cores and the one or more outer ring layers located adjacently outside of the one or more outer cores in the radial direction is equal to or greater than a relative refractive index difference between the center core and the inner ring layer.

12. A method of manufacturing an optical fiber, the method comprising:

preparing a single base optical fiber extending continu-ously between opposite ends along a longitudinal direc-tion, the single base optical fiber including:

a center core that includes a dopant that increases a refractive index, an inner ring layer located outside of the center core in a radial direction of the single base optical fiber, wherein the inner ring layer has a refractive index lower than a refractive index of the center core, one or more outer cores, each located outside of the inner ring layer in the radial direction and having a refractive index higher than the refractive index of the inner ring layer, and one or more outer ring layers, each located outside of the outer core in the radial direction and having a refractive index lower than the refractive index of the outer core located adjacently inside of each outer ring layer in the radial direction; and heating one or more locations of the single base optical fiber between the opposite ends along the longitudinal direction of the single base optical fiber to diffuse the dopant in the center core such that a relative refractive index difference $\Delta_{CF}$ between the center core and the inner ring layer becomes lower than a relative refrac-tive index difference $\Delta_{PF}$ between the one or more outer cores and the one or more outer ring layers located adjacently outside of the one or more outer cores in the radial direction, and that the relative refractive index difference $\Delta_{CF}$ in the one or more locations is locally smaller than a refractive index difference $\Delta_{C1}$ between the center core and the inner ring layer in an upstream location located upstream of the one or more locations along the longitudinal direction and a relative refractive index difference $\Delta_{C2}$ between the center core and the inner ring layer in a downstream location located downstream of the one or more locations along the longitudinal direction, wherein a difference between the relative refractive index differ-ence $\Delta_{CF}$ in the one or more locations and the refractive index difference $\Delta_{C1}$ is greater than a difference between the relative refractive index difference $\Delta_{PF}$ in the one or more locations and a refractive index dif-ference $\Delta_{P1}$ between the one or more outer cores and the one or more outer ring layers in the upstream location, and a difference between the relative refractive index differ-ence $\Delta_{CF}$ in the one or more locations and the refractive index difference $\Delta_{C2}$ is greater than a difference between the relative refractive index difference $\Delta_{PF}$ in the one or more locations and a refractive index dif-ference $\Delta_{P2}$ between the one or more outer cores and the one or more outer ring layers in the downstream location.

13. The method of manufacturing the optical fiber as recited in claim 12, wherein the dopant is germanium.

14. The method of manufacturing the optical fiber as recited in claim 12, wherein, in the single base optical fiber prior to heating the one or more locations, a relative refractive index difference between the one or more outer cores and the one or more outer ring layers located adjacently outside of the one or more outer cores in the radial direction is equal to or greater than a relative refractive index difference between the center core and the inner ring layer.

* * * * *